United States Patent [19]

Gay et al.

[11] Patent Number: 4,808,649
[45] Date of Patent: Feb. 28, 1989

[54] BETA-KETOESTER SUBSTITUTED DIORGANOPOLYSILOXANES AND PVC STABILZERS COMPRISED THEREOF

[75] Inventors: Michel Gay; Edith Canivenc, both of Lyons, France

[73] Assignee: Rhone-Poulenc Chimie, Courbevoie, France

[21] Appl. No.: 84,220

[22] Filed: Aug. 12, 1987

[30] Foreign Application Priority Data

Aug. 12, 1986 [FR] France ................. 86 11785

[51] Int. Cl.$^4$ ............................................. C08K 5/24
[52] U.S. Cl. ............................... 524/264; 524/265; 524/266; 524/267; 524/268; 524/301; 524/302; 524/393; 524/394; 524/397; 524/399; 524/400; 524/420; 524/423; 524/425; 524/436; 524/437; 556/440; 556/462; 528/26
[58] Field of Search ................. 528/26; 556/440, 462; 524/264, 265, 266, 267, 268, 301, 302, 393, 394, 397, 399, 400, 420, 423, 425, 436, 437

[56] References Cited

U.S. PATENT DOCUMENTS 3,289,406 12/1966 Panhard ........................... 60/469
4,277,595 7/1981 Deichert et al. ...................... 528/26
4,452,962 5/1984 Ginnings et al. ..................... 528/26
4,613,641 9/1986 Haubennestel et al. ............. 524/265

OTHER PUBLICATIONS

Chemical Abstract 157643T, vol. 100, (1984), Heat Statabilizers for Chlorine-Containing Polymers, Sakai Chemical Industry Co., Ltd.

Primary Examiner—Melvyn I. Marquis
Attorney, Agent, or Firm—Burns, Doane, Swecker & Mathis

[57] ABSTRACT

Diorganopolysiloxanes having the formula:

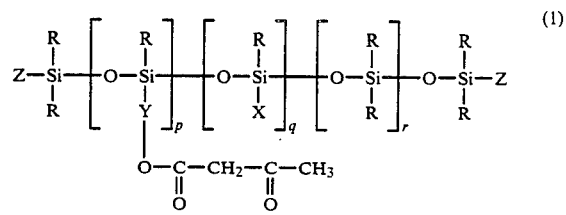

are especially useful for the stabilization of polyvinyl chloride-based polymers.

7 Claims, No Drawings

BETA-KETOESTER SUBSTITUTED DIORGANOPOLYSILOXANES AND PVC STABILZERS COMPRISED THEREOF

BACKGROUND OF THE INVENTION

1. Field of the Invention

The present invention relates to novel diorganopolysiloxanes containing beta-ketoester functional groups, to a process for the preparation thereof and to a variety of end applications therefor, especially as stabilizers for polyvinyl chloride (PVC)-based polymers and as bonding agents for organopolysiloxane elastomers.

2. Description of the Prior Art

Many diorganopolysiloxanes containing a variety of organic functional groups are known to this art, such as, for example, those noted at pages 261 to 268 of the Noll text, *Chemistry and Technology of Silicones*, English edition, (1968).

Diorganopolysiloxanes containing beta-diketone groups located at the end of the polymer chain or within the polysiloxane chain are described in German Pat. Nos. 1,193,504 and 1,795,563. Thus, these polymers, which are very difficult to prepare and which are very expensive, contain beta-diketone groups as distinct from the beta-ketoester (acetoacetate) group.

SUMMARY OF THE INVENTION

Accordingly, a major object of the present invention is the provision of novel diorganopolysiloxanes containing beta-ketoester groups, which are inexpensive, easy to prepare, and have many useful end applications, especially as stabilizers for PVC.

Briefly, the present invention features novel diorganopolysiloxanes of the formula:

$$Z-\underset{\underset{R}{|}}{\overset{\underset{|}{R}}{Si}}-\left[O-\underset{\underset{Y}{|}}{\overset{\underset{|}{R}}{Si}}\right]_p-\left[O-\underset{\underset{X}{|}}{\overset{\underset{|}{R}}{Si}}\right]_q-\left[O-\underset{\underset{R}{|}}{\overset{\underset{|}{R}}{Si}}\right]_r-O-\underset{\underset{R}{|}}{\overset{\underset{|}{R}}{Si}}-Z \quad (1)$$

$$Y = O-\underset{\overset{\|}{O}}{C}-CH_2-\underset{\overset{\|}{O}}{C}-CH_3$$

in which:
the symbols R, are radicals wherein at least 80% of the number of radicals R are methyl radicals with the remainder selected from at least one of a $C_1$–$C_4$ (inclusive) alkyl, 3,3,3-trifluoropropyl, vinyl or phenyl radical, the symbols Y, which may be identical or different, are selected from the group of $C_1$–$C_{18}$ straight chain alkylene radicals, $C_1$–$C_{18}$ branched chain alkylene radicals, $C_1$–$C_{18}$ straight chain alkylene radicals with a polyethylene oxide segment, $C_1$–$C_{18}$ branched chain alkylene radicals with a polyethylene oxide segment, $C_1$–$C_{18}$ straight chain alkylene radicals with a polypropylene oxide segment and $C_1$–$C_{18}$ branched chain alkylene radicals with a polypropylene oxide segment, the symbols X, which may be identical or different, are each a Y—OH or Y—OCOR' radical, wherein Y is as defined above and R' is a $C_1$–$C_{18}$ (inclusive) straight or branched chain alkenyl or alkyl radical, the symbols Z, which may be identical or different, are each a radical R as defined above, or a radical:

$$Y-O-\underset{\overset{\|}{O}}{C}-CH_2-\underset{\overset{\|}{O}}{C}-CH_3,$$

wherein:
Y is as defined above, or a radical OR' wherein R' is as defined above, p is an integer ranging from 1 to 50, inclusive, preferably from 1 to 16, inclusive, q is an integer ranging from 0 to 30, inclusive, preferably from 0 to 8, inclusive, and r is an integer ranging from 0 to 500, inclusive, preferably from 2 to 50, inclusive.

DETAILED DESCRIPTION OF THE PREFERRED EMBODIMENTS OF THE INVENTION

More particularly according to the present invention, when the copolymers of formula (1) are formulated as a mixture containing the same units in different numbers as in the case of certain of the examples to follow, this mixture may, of course, be represented by an average formula (1) in which p, q and r may be real numbers.

As examples of the alkyl radicals R, representative are methyl, ethyl, propyl and butyl radicals.

As examples of the diorganosiloxane unit $R_2SiO$, the following are representative:

$(CH_3)_2SiO$ $(CH_2=CH)(CH_3)SiO$ $(C_6H_5)(CH_3)SiO$ $(CF_3-CH_2-CH_2)(CH_3)SiO$

As examples of the linkage Y, the following are representative:

$-CH_2-$, $-(CH_2)_2-$, $-(CH_2)_3(OCH_2-(CH_2)_{29}$,
$-(CH_2)_3-$, $-(CH_2)_3-(O-CH_2-CH(CH_3))_{15}$,
$-CH_2-CH(CH_3)CH_3)CH_2-$, $-(CH_2)_{12}$.

The linkage $-(CH_2)_3$ is the preferred.

Z preferably is a radical R, most preferably a methyl radical.

As examples of the radical Y—OCOR', the following are representative:

$CH_2=CHCOOCH_2-$ $CH_2=CHCOO(CH_2)_3-$ $C_8H_{15}COO(CH_2)_3-$ $CH_2=C(CH_3)COO(CH_2)_3-$

R'COO preferably is an acrylate or a methacrylate radical, i.e., R' is a $C_2$–$C_3$ (inclusive) alkenyl radical.

The polymers of the formula (1) may be block or sequential random copolymers, depending on the nature of the starting copolymers used for the synthesis of the copolymers of formula (1).

The present invention also features a process for the preparation of the diorganopolysiloxanes of formula (1), according to which diketene is reacted with a hydroxylated oil of the formula:

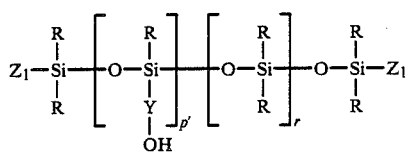

in which R, Y and r are as defined above, $p'=p+q$ and $Z_1$ is R or Y—OH.

The reaction may be carried out in bulk or, preferably, in an organic solvent medium such as ethyl acetate, at atmospheric pressure, preferably in the presence of an acid catalyst such as p-toluenesulfonic acid or a basic catalyst such as a tertiary amine, especially trimethylamine, triethylamine, and the like.

The reaction of a hydroxyalkyl group with diketene is well known to this art and, for example, is described in A. B. Boese, *Industrial and Engineering Chemistry*, Int. Ed., 32, pages 16 to 25 (1940) and in R. N. Lacey *Advances in Organic Chemistry Methods and Results*, Vol. 2, pages 240–248.

In the case where it is desired to produce a polymer of formula (1) in which $q=0$ and therefore $p'=p$, a stoichiometric amount, or preferably an excess, of diketene is employed, this being removed upon completion of the reaction, for example, by distillation under reduced pressure.

In the case where it is desired to produce a polymer of formula (1) in which q is not 0, a calculated amount, less than the stoichiometric amount, of diketene is employed, depending on the values of p and q previously selected. Later, possibly during a subsequent stage, in the case where it is desired that $X=Y—OCOR'$, the residual hydroxyalkyl groups are esterified by known means, such as an esterification, a transesterification, or the like.

Another technique to produce these polymers in which q is not 0 is to partially esterify the oil of formula (2) by known means, by the transesterification of an ester of formula R"OCOR', R" being a saturated or unsaturated hydrocarbon radical, preferably in the presence of a catalyst such as dibutyltin oxide; diketene is then reacted with the remaining unesterified hydroxyalkyl groups.

In order to prepare the starting materials of the formula (2) in the case where these products are novel or unavailable commercially, a hydroorganopolysiloxane of the formula:

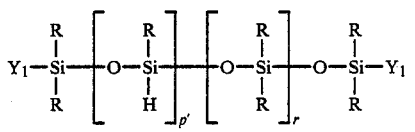

in which R, p' and r are as defined above and $Y_1$ is R or a hydrogen atom, may, for example, be reacted with an alkenically unsaturated alcohol of formula WOH in which W is a straight or branched chain radical containing 2 to 18 carbon atoms. Among such alcohols, allyl and methallyl alcohols are more particularly employed, using a platinum hydrosilylation catalyst according to U.S. Pat. Nos. 2,970,150 and 4,160,775.

Polymers of formula (3) are products which are well known to the silicone industry and are generally commercially available. For example, they are described in U.S. Pat. Nos. 3,220,972, 3,436,366, 3,697,473 and 4,340,709.

Polymers of formula (1) are especially useful as additives for various organopolysiloxane compositions which are converted to elastomers on hardening, with a view to promoting the adhesion of these elastomers to metal supports. In this case, they may be used in an amount of 0.05 to 5 parts, preferably 0.1 to 2 parts, per 100 parts of the organopolysiloxane compositions.

The organopolysiloxane compositions which can be used are, in particular, two-component (or two-pack) compositions crosslinking by polycondensation, as described in U.S. Pat. Nos. 3,678,002, 3,888,815 and 3,933,729 and British Pat. No. 2,032,946, and those crosslinking by polyaddition, as described in U.S. Pat. Nos. 3,220,972, 3,284,406, 3,436,366 and 3,697,473.

Acid (U.S. Pat. Nos. 3,035,016 and 3,409,573), neutral (U.S. Pat. No. 3,689,457, British Pat. No. 2,052,540 and European Patent EP-A-69,256), and basic (U.S. Pat. Nos. 3,378,520, 3,417,047 and 3,758,441) single-component compositions and compositions crosslinking in heated state in the presence of an organic peroxide may also be used (U.S. Pat. Nos. 3,821,140 and 3,836,489 and British Pat. Nos. 2,091,281 and 2,091,282).

Another more particularly advantageous application of the polymers of formula (1) is their use in a process for stabilizing halogenated polymers, and especially polymers based on vinyl chloride, characterized by the combined use of:

(a) an effective amount of at least one organic derivative of zinc, (b) an effective amount of at least one organic derivative of a metal from Group IIa of the Periodic Table or at least one hydrotalcite, and (c) an effective amount of at least one polymer of formula (1).

By the terms "organic derivative of zinc" and "organic derivative of a Group IIa metal" are intended:

Salts, the anions of which originate principally from saturated or unsaturated aliphatic monocarboxylic or dicarboxylic acids containing 2 to 24 carbon atoms, or from substituted or unsubstituted alkyl monoesters containing 1 to 24 carbon atoms, or alkenyl monoesters containing 3 to 24 carbon atoms of the aliphatic dicarboxylic acids mentioned above, or from substituted or unsubstituted aromatic or alicyclic monocarboxylic acids; among the most commonly used anions, exemplary are those derived from maleic, acetic, propionic, hexanoic, 2-ethylhexanoic, octanoic, decanoic, undecanoic, lauric, myristic, palmitic, stearic, oleic, ricinoleic, behenic, hydroxystearic, hydroxyundecanoic, benzoic, phenylacetic, alkylbenzoic, para-tert-butylbenzoic and salicylic acids;

Metal derivatives (phenolates) of substituted or unsubstituted phenolic compounds, such as phenol or phenols substituted with an alkyl radical preferably containing 4 to 24 carbon atoms;

Mercaptides, for example, zinc(isooctyl 2-thioacetate); and

Chelates of $\beta$-dicarbonylated compounds.

Among the metal derivatives mentioned above, those derived from carboxylic acids or from phenolic compounds are preferably selected for practical or for economic reasons.

The hydrotalcites which are also used as a compound (b) according to the invention are compounds having the general formula:

$$Mg_{(1-a)}Al_a(CH)_2A_{a/2}, pH_2O \qquad (4)$$

in which:
a is a number from 0 to 0.5;
A represents $SO_4^{--}$ or $CO_3^{--}$; and
p represents the number of molecules of water per molecule of hydrotalcite.

These hydrotalcites include natural hydrotalcites and hydrotalcites obtained by treating natural hydrotalcites.

These are, in particular, the hydrotalcites described in French Pat. No. 2,483,934.

Thus, zinc salts of propionic, octanoic, lauric, stearic, oleic, ricinoleic, benzoic, para-tert-butylbenzoic and salicylic acids, or 2-monoethylhexyl maleate and zinc nonylphenates are frequently used as compound (a); calcium, magnesium, barium or strontium salts of propionic, octanoic, lauric, stearic, oleic, ricinoleic, benzoic, para-tert-butylbenzoic and salicylic acids and 2-monoethylhexyl maleate and calcium, magnesium, barium or strontium nonylphenates are frequently used as compound (b); hydrotalcites, and more preferentially commercially available hydrotalcites obtained by treating natural hydrotalcites are also used as compound (b).

Among the derivatives (b), calcium derivatives and magnesium derivatives, and hydrotalcites and more particularly still, calcium derivatives and hydrotalcites which provide very good results will be preferred for applications in the food industry.

The compounds (b) are also commonly used in the form of mixtures, such as organic salts of Ca and Ba, organic salts of Ca and Mg, hydrotalcite and organic salt of Ca, hydrotalcite and organic salt of Ba or hydrotalcite and organic salt of Mg.

Concentrations from 0.005 to 5% by weight of compounds (b) relative to the polymer to be stabilized and preferably from 0.02 to 2%, added to the other stabilizers, permit very good results to be obtained.

Concentrations from 0.005 to 1% by weight of compound (a) relative to the polymer to be stabilized, and preferably from 0.01 to 0.6%, provide very good results.

The proportions in which diorganopolysiloxanes of formula (1) are used relative to the polymer vary very widely depending on their molecular weight; these proportions generally range from 0.005% by weight to 5% by weight relative to the polymer. 0.05% by weight to 2% by weight of diorganopolysiloxanes of formula (1) relative to the polymer are preferred.

In general, the more rigid the polymer compositions to be stabilized, i.e., the lower their plasticizer content, the greater the proportion by weight of each of the constituents of the compositions according to the invention are used in the polymer compositions.

It should be appreciated that within the range of the different proportions given for each of the constituents (a), (b) and (c) relative to the polymer, one skilled in the art will have to adjust the relative ratios of these different constituents depending on the formulation to be produced which is more particularly geared to achieving the desired result, or depending on the origin or the method of preparation of the polymer.

Thus, polymers prepared in suspension, for example, may generally contain a higher proportion of zinc than polymers prepared in bulk, but these proportions, nevertheless, preferably remain between the values mentioned above. Conjointly with the organic derivatives of zinc, the organic derivatives of the metals of Group IIa of the Periodic Table and/or the hydrotalcites and diorganopolysiloxanes formula (1), it may be advantageous to use a polyhydric alcohol while carrying out the process according to the invention, although such a compound is not indispensable in nature. Its presence is particularly advantageous for stabilizing vinyl chloride-based polymers prepared in bulk.

Polyhydric alcohols are generally suitable for extending the stabilizing effect of the metal or organic compounds according to the invention. However, a compromise must be found because these products have a tendency to discolor the compositions. Because of the problems involved in the preparation of vinyl chloride-based polymers at high temperature, it is preferable that the polyhydric alcohols used in the stabilization process according to the invention have a boiling point greater than 150° C. and most frequently greater than 170° C.

As examples of such polyhydric alcohols, representative are the triols such as trimethylol propane, glycerol, hexane-1,2,6-triol, butane-1,2,4-triol and tris(hydroxyethyl)isocyanurate, tetrols such as pentaerythritol and diglycerol, pentitols such as xylitol, hexitols such as sorbitol, mannitol and dipentaerythritol, polyhydric alcohols containing eight hydroxyl groups such as tripentaerythritol and polymers containing free hydroxyl groups, such as polyvinyl alcohols, especially those in which fewer than 30 mole % of ester groups remain relative to the hydroxyl groups as a whole, and esters which have a viscosity of from approximately 4 mPa.s to 60 mPa.s in a 4% by weight aqueous solution at 25° C.

0.005% to 1% by weight of the polyhydric alcohol relative to the polymer to be stabilized, and preferably 0.01% to 0.6%, is typically useful.

It has been found that the polyhydric alcohols which have more than four hydroxyl groups in their molecule give particularly satisfactory results.

Thus, polyhydric alcohols such as sorbitol, mannitol and xylitol are particularly effective according to the invention, and this is so even when they are used at low concentrations. Accordingly, although these compounds are used as concentrations preferably ranging from 0.01% to 0.25% by weight relative to the weight of the polymer, an improvement in the stabilization of the polymer compositions containing same is manifest and no discoloration is observed at concentrations as low as 0.005% to 0.01% by weight relative to the weight of the polymer.

To implement the process of the invention, another object thereof features mixing at least one organic derivative of zinc, at least one organic derivative of a metal from Group IIa of the Periodic Table, or at least one hydrotalcite, and at least one diorganopolysiloxane of formula (1).

Such mixtures may be prepared in all proportions; the proportions by weight of the different constituents are generally such that they comprise:
from 5 to 40% of the organic derivative of zinc;
from 5 to 90% of the organic derivative of a metal from Group IIa of the Periodic Table or of hydrotalcite; and
from 5 to 90% of diorganopolysiloxanes of formula (1).

Finally, the invention also features stabilized polyvinyl chloride-based composition, per se.

By the term "polyvinyl chloride-based composition" is intended compositions containing a vinyl chloride homopolymer, a copolymer of vinyl chloride with various other monomers or a mixture of polymers or copolymers, a major portion of which is obtained from vinyl chloride.

In general, any type of vinyl chloride homopolymer may be suitable irrespective of the method of preparation thereof: polymerization in bulk, in suspension, in dispersion or of any other type and irrespective of the intrinsic viscosity thereof.

The vinyl chloride homopolymers may be chemically modified such as, for example, the chlorinated vinyl chloride polymers.

Many vinyl chloride copolymers may also be stabilized against the effects of heat: yellowing and degradation. They include copolymers obtained by the copolymerization of vinyl chloride with other monomers containing an ethylene bond which can be polymerized such as, for example, the vinyl esters: vinyl acetate and vinylidene chloride; maleic or fumaric acids (or the esters thereof); olefins: ethylene, propylene and hexene; acrylic acid esters; styrene; or vinyl ethers: n-vinyl-dodecyl ether.

These copolymers usually contain at least 50% by weight of vinyl chloride recurring units. However, the invention is particularly applicable to copolymers containing at least 80% by weight of vinyl chloride recurring units.

The invention is also satisfactorily applicable to mixtures of polymers containing minor amounts of other polymers such as halogenated polyolefins or acrylonitrilebutadiene-styrene copolymers or to mixtures of homopolymers or of copolymers such as those defined above.

These compositions may be either "rigid" or "flexible". When "rigid" compositions are used, in addition to the polymer and the various stabilizers or adjuvants, they may then contain impact resistance modifiers, pigments and/or fillers and lubricants which aid in their preparation.

When "flexible" compositions are used, in addition to the polymer and the various stabilizers or adjuvants, they may contain primary or secondary plasticizers, pigments and/or fillers, lubricants, and the like. These stabilizers are essentially antioxidants, stabilizers against light or UV radiation and other compounds known for their effect on stabilization against heat such as, for example, epoxides, phosphites and phenolic compounds.

These epoxides are generally complex compounds, usually epoxidized polyglycerides such as epoxidized soybean oil, epoxidized linseed or fish oil, epoxidized tallow oil, or epoxidized fatty acid esters or epoxidized hydrocarbons such as epoxidized polybutadiene or epoxidized ethers.

Various alkyl or aryl phosphites such as, for example, phenyl 2-ethylhexyl phosphite, triisodecyl phosphite or diisoctyl pentaerythryl diphosphite, are also known for their stabilizing activity.

Phenolic compounds have also been used as heat stabilizers: these are mainly butyl hydroxytoluene (BHT) and other substituted phenols.

It is apparent that the addition of small amounts of additional stabilizers which are now well known to the art, such as, for example, β-diketone organic compounds or nitrogenous organic compounds such as β-aminocrotonic acid esters or alpha-phenyl-indole derivatives or substituted dihydropyridine derivatives, or other sulfur-containing compounds such as thiomalic acid diesters, to the subject stabilizers is within the ambit of the invention.

Diorganopolysiloxanes of formula (1) may be introduced into the polymer either completely or in part, into the monomer or the comonomers at any stage of the polymerization.

The three stabilizers according to the invention may be incorporated at the same time as the other adjuvants. They may also be mixed among themselves or with certain of the adjuvants. The stabilizing composition will then be subsequently incorporated into the polymer in the powdery form. All the commonly known methods in this art may be suitable for effecting mixing of the ingredients.

The homogenization may, for example, be carried out at ambient temperature in a slow mixer or may be carried out in a rapid mixer, heating the mixture to a temperature of from ambient temperature to 120° C. In the latter embodiment, the solid adjuvants and the polymer in the powdery form are generally introduced into the rapid mixer at ambient temperature, whereas the liquid adjuvants are added at a temperature of 40° to 60° C.

The stirring is continued until the homogenization is complete. Periods of time of from 3 to 20 minutes are generally sufficient, but these periods of time are provided only by way of illustration.

The stabilized polyvinyl chloride-based compositions according to the invention can be used employing all techniques commonly used for shaping compositions of PVC and copolymers thereof, for example: injection; extrusion; extrusion blow-molding; calendering and rotational molding.

The stabilization according to the invention enables the appearance of yellowing during the period when the polyvinyl chloride-based composition employed is heated to 180° C. and above, to be slowed considerably, if not prevented completely, and homogeneous, colorless, transparent end-products with no exudation to be obtained.

Organic beta-ketoesters are known, from French Pat. No. 1,435,882, for their stabilizing action on polyvinyl chloride resins.

However, in addition to their particularly efficient stabilizing action, the diorganopolysiloxanes of formula (1) impart surface properties such as external lubrication, "processing-aid" action, antiadhesiveness, demolding, water-repellence, surface appearance, nonadhesiveness to dusts, abrasion resistance, "antifogging" and hemocompatibility to the vinyl chloride-based polymers and are remarkably compatible with PVC.

In order to further illustrate the present invention and the advantages thereof, the following specific examples are given, it being understood that same are intended only as illustrative and in nowise limitative. In the formulae in said examples to follow, Me is the radical $CH_3$.

EXAMPLE 1

A 500 ml three-necked round-bottomed flask equipped with a central stirrer, a reflux condenser and a thermometer holder was charged with 100 g of a hydroxypropylated oil of the average formula:

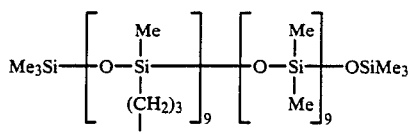

with an alcohol group content of 468 meq/100 g. 1 ml of triethylamine as catalyst and 150 ml of a solvent, which was ethyl acetate, were added and the homogeneous mixture thereby obtained was then heated to 45°–50° C. 41.5 g (0.494 mole) of diketene were then poured therein over the course of one hour, while maintaining the temperature at 50° C. A slight exothermicity was observed, especially during the initial stages of the addition. When the addition was complete, the reaction mixture was maintained at 50° C. for an additional period of one hour and then allowed to return to ambient temperature. The excess diketene was removed by evaporation under reduced pressure (0.7 pKa) at 50°–60° C. A cloudy yellow oil was then obtained, which was filtered to obtain 138 g of a clear and odorless yellow oil.

The absence of a strong acidity (dehydroacetic acid) was monitored by acidimetry using 0.5N aqueous sodium hydroxide in a water/acetone medium and a low acidity titer (pKa approximately 10) of 331 meq/100 g representing the β-ketoester group was obtained. The yield of β-ketoester group relative to the number of alcohol groups used at beginning was 97.6%.

The polymer obtained is represented by the following average formula:

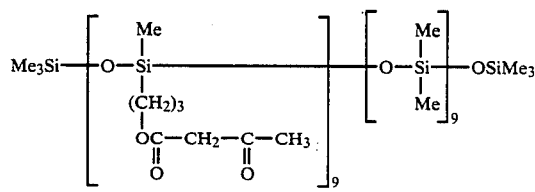

EXAMPLES 2 TO 5

Following the procedure of composition of the initial gamma-hydroxypropylated oil, polymers of the following average formula were prepared:

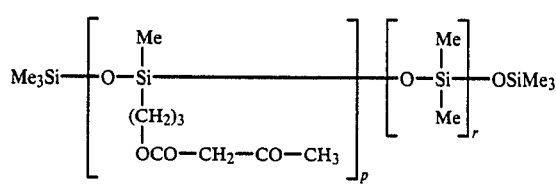

The values of p and r and the titer t in terms of the amount of β-ketoester expressed in meq/100 g are reported collectively in Table I below:

TABLE I

| Example | P | r | t |
|---------|-----|----|-----|
| 2 | 4.5 | 11 | 230 |
| 3 | 12 | 17 | 298 |
| 4 | 12 | 45 | 197 |
| 5 | 12 | 6 | 362 |

EXAMPLE 6

The procedure of Example 1 wad repeated, starting with the same hydroxypropylated oil (100 g, alcohol group content 468 meq/100 g), except that a smaller quantity of diketene (20 g, which amounts to 0.238 mole) was poured therein.

An odorless, clear, yellow oil of the following formula and with an acetoacetate group content of 188 meq/100 g was obtained:

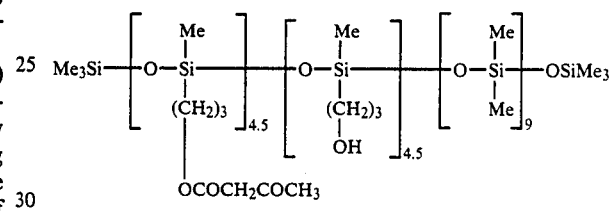

EXAMPLE 7

The reaction was carried out employing a gammahydroxypropylated oil of the average formula:

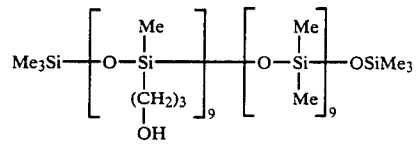

A partial esterification of the alcohol groups of such oil was carried out using methyl methacrylate in the presence of dibutyltin oxide.

An oil of the following formula was obtained:

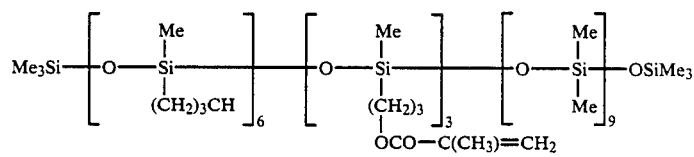

The reaction was carried out using a slight excess of diketene, operating as in Example 1. After the removal of the excess diketene, a clear, odorless, yellow oil of the following approximate formula, with an acetoacetate group content of 220 meq/100 g, was obtained:

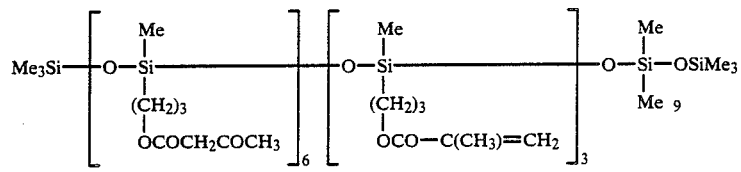

COMPARATIVE EXAMPLES 8 TO 10 AND EXAMPLES 11 TO 14

The following basic homogeneous composition A was prepared:

1000 g of PVC in powdery form, characterized by a viscosity index of 80 according to the standard NF T 51013, obtained by suspension polymerization and sold under the registered trademark LACQVYL SO 71 S', 80 g of impact reinforcer (butadiene/styrene/methyl methacrylate copolymer), 2.5 g of calcium stearate, 2.5 g of zinc stearate, and 40 g of epoxidized soybean oil.

Six fractions of 112.5 g each of this composition A were withdrawn (each fraction contained 100 g of PVC).

One fraction, serving as the control, was used as such, without adding stabilizer (Comparative Example 8).

A certain quantity (in grams) of one of the acetoacetate group-containing oils from Examples 1 and 2 was added to each of these fractions according to the details given in the table below (Examples 11 to 14). By way of comparison, in two of these fractions, the acetoacetate group-containing oil was replaced with a common acetoacetate ester, this being octadecyl acetoacetate, hereinafter designated OAA (Comparative Examples 9 and 10).

Using the different compositions obtained and the unmodified composition A, 1 mm-thick sheets were prepared by mixing in a two-cylinder mixer for 3 minutes at 180° C. Rectangular samples, approximately 1×2 cm in size, were cut from these sheets.

The thermal aging test was carried out on these samples, in a fan-assisted oven at 180° C., over varying periods of time (t in minutes).

The color of the samples was measured by comparison with a Lovibond disc according to the Gardner scale.

The results obtained are reported collectively in Table II below:

TABLE II

| Example | Stabilizer and quantity in g per 100 g of PVC | | | COLOR IN GARDNER SCALE AS A FUNCTION OF TIME AT 180° C. | | | | | | | |
|---|---|---|---|---|---|---|---|---|---|---|---|
| | | | | t (min) 0 | 7 | 14 | 21 | 30 | 45 | 60 | 80 |
| 8 | none | | | 4 | 6 | 6 | 7 | 7 | 9 | 11 | black |
| 9 | OAA | | 0.3 | 0.5 | 2 | 2.5 | 3 | 4 | 8 | 11 | black |
| 10 | OAA | | 0.6 | 0.5 | 2 | 2 | 2.5 | 3.5 | 7 | 10 | black |
| 11 | Oil | Ex. 1 | 0.3 | 0.5 | 1 | 2 | 2 | 3 | 7 | 11 | black |
| 12 | Oil | Ex. 1 | 0.6 | 0.5 | 1 | 1.5 | 2 | 2.5 | 7 | 10 | black |
| 13 | Oil | Ex. 2 | 0.3 | 0.5 | 2 | 2 | 3 | 4 | 7 | 10 | black |
| 14 | Oil | Ex. 2 | 0.6 | 0.5 | 1 | 2 | 2 | 3.5 | 7 | 11 | black |

As will be seen from Table II, the acetoacetate group-containing oils of the invention have a better PVC-stabilizing effect than octadecyl acetoacetate.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane of the formula

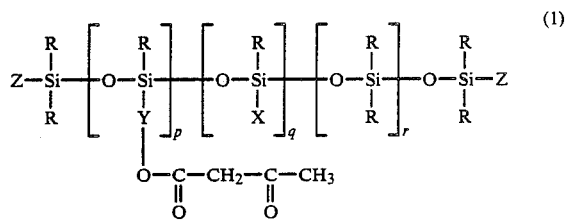

in which:

the symbols R are radicals wherein at least 80% of the number of radicals represented by R are methyl radicals with the remainder being selected from at least one of a $C_1$-$C_4$ alkyl, 3,3,3-trifluoropropyl, vinyl or phenyl radical;

the symbols Y, which may be identical or different, are selected from the group of $C_1$-$C_{18}$ straight chain alkylene radicals, $C_1$-$C_{18}$ branched chain alkylene radicals, $C_1$-$C_{18}$ straight chain alkylene radicals with a polyethylene oxide segment, $C_1$-$C_{18}$ branched chain alkylene radicals with a polyethylene oxide segment, $C_1$-$C_{18}$ straight chain alkylene radicals with a polypropylene oxide segment and $C_1$-$C_{18}$ branched chain alkylene radicals with a polypropylene oxide segment;

the symbols X, which may be identical or different, are each a Y—OH or Y—OCOR' radical, wherein Y is as defined above and R' is a $C_1$-$C_{18}$ straight or branched chain alkenyl or alkyl radical;

the symbols Z, which may be identical or different, are each a radical R as defined above, a radical

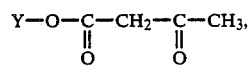

wherein Y is as defined above, or OR', wherein R' is as defined above;

p is an integer ranging from 1 to 50;
q is an integer ranging from 0 to 30; and
r is an integer ranging from 0 to 500.

2. The diorganopolysiloxane as defined by claim 1, wherein p ranges from 1 to 16, q ranges from 0 to 8, and r ranges from 2 to 50.

3. The diorganopolysiloxane as defined by claim 1, wherein R and Z are methyl radicals, Y is $-(CH_2)_3-$ and X is $CH_2=CHCOO-(CH_2)_3-$ or $CH_2=C(CH_3)COO(CH_2)_3-$.

4. A process for the preparation of the diorganopolysiloxane as defined by claim 1, comprising reacting diketene with a hydroxylated oil of the formula:

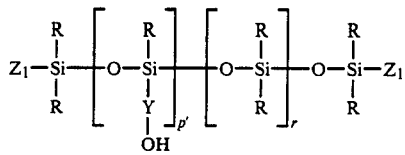
(2)

in which p, q, R, Y and r are as defined in claim 1, $p'=p+q$ and $Z_1$ is R or Y—OH, and, where q, as defined in claim 1, is not zero, X is Y—OCOR' in which Y and R' are as defined in claim 1, and X is obtained by esterifying the residual hydroxyalkyl groups.

5. A stabilized polymer composition of matter, comprising:
  (a) a vinyl chloride-based polymer;
  (b) an effective stabilizing amount of at least one organic derivative of zinc;
  (c) an effective stabilizing amount of at least one organic derivative of a metal from Group IIa of the Periodic Table, or at least one hydrotalcite; and
  (d) an effective stabilizing amount of at least one diorganopolysiloxane as defined by claim 1, wherein the stabilizing amounts of (b), (c) and (d) at least considerably slow the appearance of yellowing when the composition is heated to 180° C. and above.

6. The stabilized polymer composition as defined by claim 5, comprising:
  from 0.005 to 1% by weight of said compound (b);
  from 0.005 to 5% by weight of said compound (c); and
  from 0.005 to 5% by weight of said compound (d).

7. A shaped article comprising the stabilized polymer composition as defined by claim 5.

* * * * *